Figure 1:
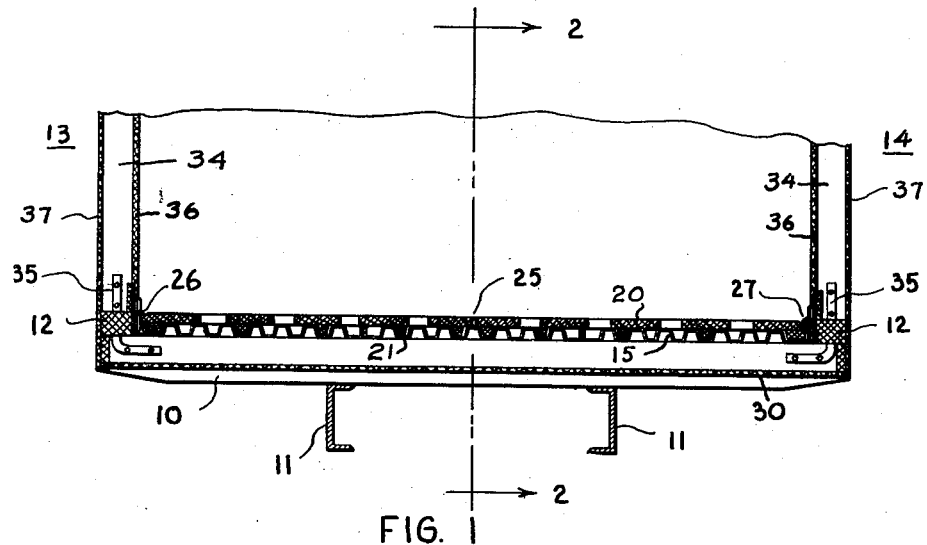

May 23, 1950 — P. JOLLY — 2,508,674
FLOOR STRUCTURE
Filed Sept. 17, 1945 — 2 Sheets-Sheet 1

PETER JOLLY
INVENTOR
BY E. A. Buckham
ATTORNEY

May 23, 1950   P. JOLLY   2,508,674
FLOOR STRUCTURE

Filed Sept. 17, 1945   2 Sheets-Sheet 2

PETER JOLLY
INVENTOR
BY [signature]
ATTORNEY

Patented May 23, 1950

2,508,674

UNITED STATES PATENT OFFICE 2,508,674

FLOOR STRUCTURE

Peter Jolly, Portland, Oreg.

Application September 17, 1945, Serial No. 616,674

2 Claims. (Cl. 296—28)

The present invention relates to floor structures for food storage enclosures and, while it is not necessarily limited thereto, the invention is particularly suitable for use in connection with air conditioned truck bodies.

Frequently perishable goods such as fruit, vegetables, meat and the like are stored or transported in air conditioned, or air cooled enclosures. In order to facilitate the circulation of air about the goods, they are required to be spaced from the floor and side walls of the enclosure so as to provide passages thereabout for the air. In the ordinary truck body designed for transporting perishable goods, the floor is so constructed as to have a smooth plane surface, it being usually made of oak boards and which are frequently reinforced with metal shapes arranged therebetween. Such a floor construction is very heavy and in a truck body unnecessary weight is a very undesirable factor for obvious reasons. Because of the flat surface of such a floor, a grating must be provided thereupon in order to support the goods above the floor and to provide circulating air passages therebeneath. Such a grating is usually made of wood slats comprised of a plurality of spacing stringers extending longitudinally of the floor and a plurality of slats extending transversely of the body across the top of the stringers. Such grating, supported upon a flat floor is easily broken by the load carried thereupon resulting in a high maintenance cost. Thus the combination of a conventional flat floor and grating is not only excessively heavy, of high initial cost but also expensive to keep up.

It is a primary object of the present invention, therefore, to provide a new and improved floor structure for an air conditioned storage enclosure, which structure is relatively light in weight, strong, inexpensive to build and to maintain and which provides adequate air circulation passageways beneath the goods which may be supported thereupon.

A more specific object of the invention is to provide a new and improved floor structure for a truck body suitable for transporting perishable goods which floor structure is relatively light in weight and includes a grating which is relatively strong and capable of supporting any load which may be carried in the body without danger of breakage, the grating and floor providing a multiplicity of circulating air passages beneath the goods carried in the body.

It is a still further object of the present invention to provide a new and improved floor structure for an air conditioned enclosure for perishable goods which includes a relatively thin sheet metal floor and a superimposed grating, the sheet metal floor being so constructed and arranged that the grating, even though of relatively light weight construction, is firmly supported thereupon and capable of bearing heavy loads without resulting in breakage of the grating, the combination of the floor and grating being further so designed as to provide a multiplicity of circulating air passages along the floor beneath the goods.

In accordance with an illustrated embodiment, the invention comprises an enclosure including a plurality of base frame members having a corrugated sheet metal floor provided across the top of such frame members and secured relatively thereto, the corrugations of the sheet metal floor being relatively deep and wide. A grating consisting of a plurality of spaced apart wood slats is positioned upon the sheet metal floor, the slats engaging with and supported across the upper surface of the corrugation ridges and also secured relatively together by longitudinal stringers fitting cooperatively into the spaces between the longitudinal ridges of the corrugated floor. The grating is centrally divided longitudinally of the floor and the opposite side sections are hingedly secured to the opposite side walls of the enclosure whereby they may be swung upwardly for cleaning the corrugated floor therebeneath. The spaces between the upwardly extending ridges of the corrugated floor provide a multiplicity of circulating air passages extending longitudinally of the enclosure, which passages further communicate with the spaces between adjacent slats of the floor in order to permit free circulation of air along the floor and upwardly between the goods piled on the floor.

For a consideration of what is believed novel and inventive, the attention is directed to the following description taken in connection with the accompanying drawings while the features of novelty characterizing the invention will be pointed out with greater particularity in the appended claims.

Figure 2:
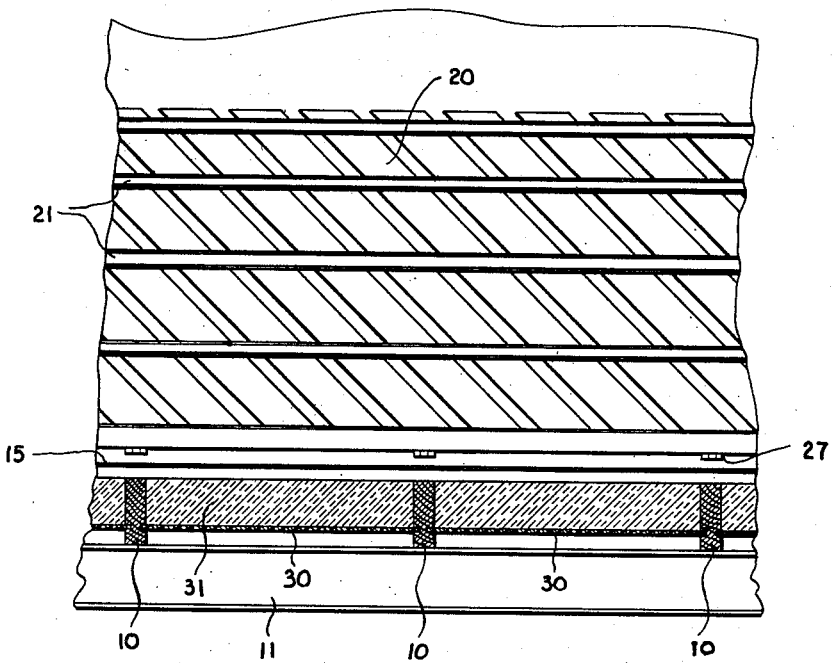
Figure 3:
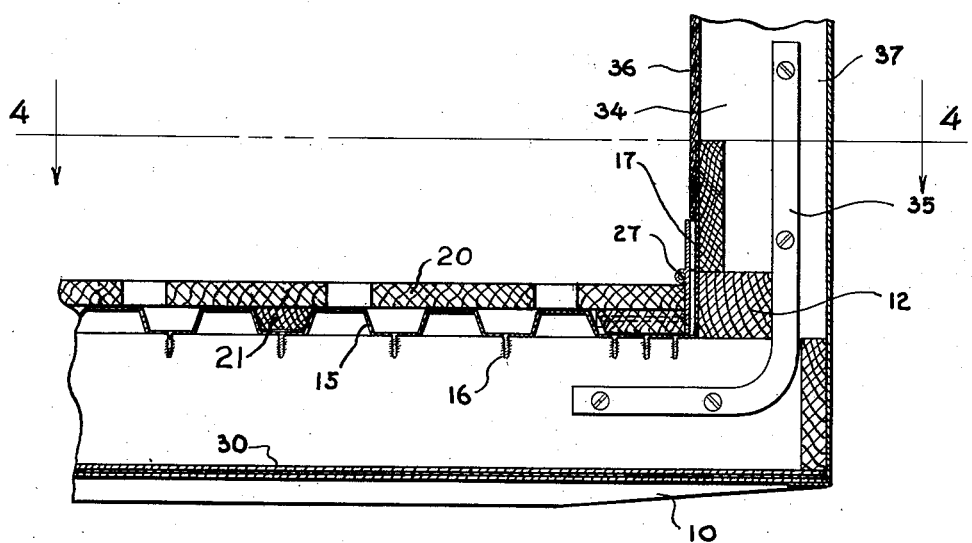
Figure 4:
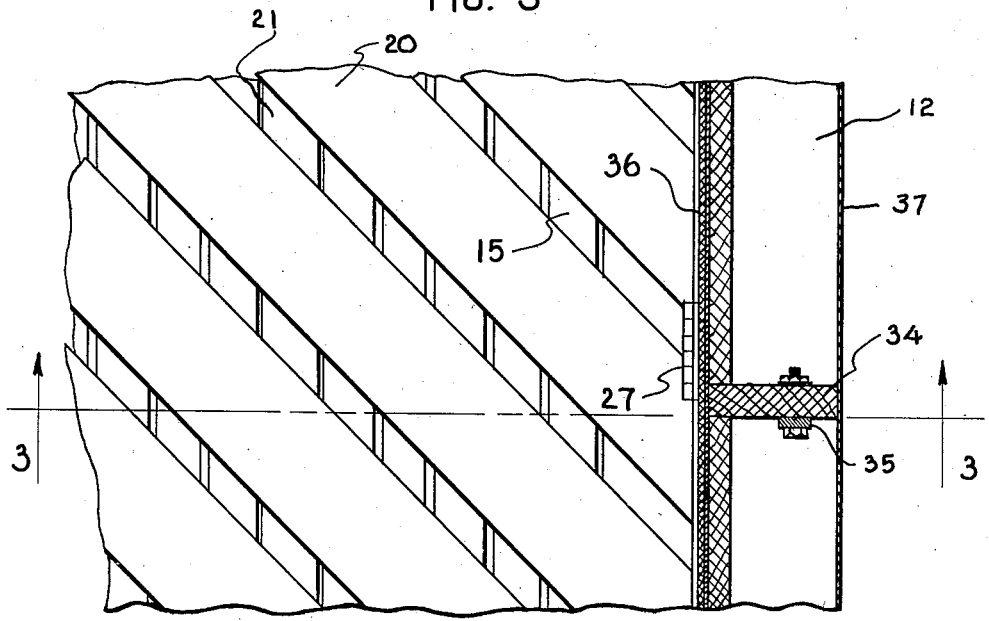

In the drawings Fig. 1 is a partial transverse cross-sectional view taken through a truck body provided with a floor structure according to the present invention; Fig. 2 is a fragmentary longitudinal sectional view taken along line 2—2 of Fig. 1 but showing the grating in an upwardly adjusted position; Fig. 3 is an enlarged fragmentary sectional view illustrating certain details of the floor structure of the present invention; and Fig. 4 is a plan view taken along the line 4—4 of Fig. 3.

The floor structure of the present invention will be described with particular reference to a truck body of the air conditioned or insulated type such as is usually provided for transporting perishable goods or food products like fruits, vegetables and meat. It will be understood by one skilled in the art, however, that the floor structure disclosed is equally applicable to any other form of air conditioned enclosure adapted for storage of perishable goods.

Referring now to the drawings the truck body shown comprises a plurality of transverse base frame members 10 for supporting the body upon the longitudinal frame members 11 of the truck chassis. The transverse frame members 10 are tied together along their outer ends by sill members 12 extending longitudinally of the truck body at the bottom of the opposite side walls 13 and 14. A corrugated sheet metal floor 15 extends across the top of the transverse frame members 10, the corrugations of the floor being relatively deep and wide and extending longitudinally of the truck body. As illustrated more clearly in the enlarged sectional view of Fig. 3 the corrugated sheet metal floor 15 may be secured onto the upper surface of the transverse frame members 10 by means of screws 16.

In actual practice, I prefer to form the panels making up the sheet metal floor 15 out of aluminum though it is to be understood that any other kind of sheet metal may be used if desired. Corrugated aluminum is particularly desirable for the construction of a floor for an automotive truck vehicle in that it is light in weight and structurally strong. The sheets making up the floor 15 are turned up along the opposite side walls a suitable distance as indicated at 17 in order to provide against leakage of water to the insulation therebeneath when the floor is washed off.

The corrugated floor 15 does not in and of itself provide a suitable loading surface because it would be difficult to walk or to push a wheeled hand truck thereacross and a wood grating is provided consisting of a plurality of spaced apart diagonally extending slats 20, which slats are secured together by spaced apart stringers 21 extending longitudinally of the floor. The stringers 21 are of such a shape as to depend cooperatively within a corresponding groove between a pair of adjacent ridges in the corrugated floor. The grating may be divided into a plurality of convenient sized panels and as shown in the drawings these panels are divided down the longitudinal center line of the vehicle body as shown at 25 in Fig. 1, the panels on opposite sides of the center line being hinged as indicated at 26 and 27 to the side walls of the vehicle body. The grating panels may therefore be swung upwardly to a position flat against the side walls of the body as shown in Fig. 2 and, in which position of the grating, the sheet metal floor may be washed for cleaning the same.

Because of the fact that the transverse, or diagonal grating slats 20 contact and rest upon the flattened upper surfaces of the ridges of the corrugated floor and, furthermore, because of the fact that the corrugations of the floor are spaced relatively closely together any concentrated load which may be applied upon the slats of the grating is distributed over a considerable area of the sheet metal flooring. Due to the channel shape of the corrugations forming the floor 15, and even though the sheets making up the floor are of relatively light weight aluminum, they are capable of sustaining any load normally carried in such a truck body. The longitudinal stringers 21 are provided merely for securing the slats 20 together in a suitably spaced apart relation and are not required for imparting any structural strength to the grating although, it will be observed, because of the fact that the thickness of the stringers 21 corresponds substantially to the depth of the grooves in the corrugated floor weight may also be transmitted therethrough to the upper surface of the transverse frame members 10 at such points. Only a relatively few such longitudinal stringers 21 are provided, and as shown more clearly in the view of Fig. 2 only a relatively few of the grooves in the corrugated floor 15 are filled thereby. The remaining outwardly facing grooves in the corrugated floor 15 define a multiplicity of circulating air passages extending longitudinally of the truck body. These circulating air passages further communicate with the spaces between the grating slats whereby the air may circulate freely upwardly between the cargo packages.

It is to be understood that the space beneath the sheet metal floor 15 as well as the side walls of the vehicle body may be suitably insulated and as shown in the drawings the transverse frame members 10 are longitudinally rabbeted for receiving plywood panels 30 therebetween which panels are spaced downwardly a suitable distance from the floor 15 and designed for supporting a suitable thickness of insulation 31 beneath the floor. The side walls of the vehicle body comprise a plurality of uprights 34 which are suitably anchored at their lower ends to the longitudinal sills 12 and the transverse frame members 10 by means including iron braces 35. The inner side wall of the body may be defined by panels 36 while a sheet metal panel 37 defines the outer surface, the space between the panels 36 and 37 being adapted to be filled with insulation of any suitable form. Such side wall insulation has been omitted from the drawings in order to show the structural details.

Having described the invention in what is considered to be a preferred embodiment thereof it is desired that it be understood that the specific details shown are merely illustrative and that the invention may be carried out in other ways.

What I claim is:

1. A truck body floor structure comprising a plurality of spaced apart transverse frame members, a corrugated metal sheet secured to the upper surface of said transverse frame members with the corrugations extending longitudinally of said body, the outer surfaces of the corrugations of said sheet being flat and relatively wide, a grating comprising a plurality of slats extending transversely of said body across the top of said sheet, longitudinal stringers securing said slats together, said stringers extending parallel with the corrugations of said sheet and having a cross section substantially identical to the cross section of the corrugations in the upper surface of said sheet, the lower surface of said slats resting across the upper surface of the corrugations of said sheet, the lower surface of said stringers resting upon the bottom of said corrugations, said grating being hingedly secured to the side walls of said body.

2. A truck body floor structure comprising a plurality of spaced apart transverse frame members, a corrugated metal sheet secured to the upper surface of said transverse frame members with the corrugations extending longitudinally of said body, the outer surfaces of the corrugations of said sheet being flat and relatively wide, a grating comprising a plurality of slats extending transversely of said body across the top of said sheet, longitudinal stringers securing said slats together, said stringers extending parallel with the corrugations of said sheet and having a thickness substantially identical to the depth of the corrugations in the upper surface of said sheet, the width of said stringers being slightly less than the width of said corrugations, the lower surface of said slats resting across the flat upper surface of the corrugations of said sheet, the lower surface of said stringers resting upon the bottom of said corrugations.

PETER JOLLY.

REFERENCES CITED

The following references are of record in the file of this patent:

UNITED STATES PATENTS

| Number | Name | Date |
|---|---|---|
| 1,031,060 | Gibbs | July 2, 1912 |
| 1,407,679 | Ruthrauff | Feb. 21, 1922 |
| 1,806,428 | Travis | May 19, 1931 |
| 2,142,797 | Murphy | Jan. 3, 1939 |
| 2,178,739 | Crede | Nov. 7, 1939 |
| 2,274,998 | Webster | Mar. 3, 1942 |
| 2,278,354 | Johnston | Mar. 31, 1942 |
| 2,300,719 | Winship | Nov. 3, 1942 |
| 2,315,801 | Lave | Apr. 6, 1943 |
| 2,380,861 | Meyer et al. | July 31, 1945 |
| 2,466,073 | Battley et al. | Apr. 5, 1949 |